(12) United States Patent
Lu

(10) Patent No.: US 7,948,202 B2
(45) Date of Patent: May 24, 2011

(54) STARTING CIRCUIT FOR SINGLE-PHASE AC MOTOR

(75) Inventor: Chuping Lu, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 268 days.

(21) Appl. No.: 12/141,968

(22) Filed: Jun. 19, 2008

(65) Prior Publication Data

US 2009/0174356 A1 Jul. 9, 2009

(30) Foreign Application Priority Data

Jan. 3, 2008 (CN) .................. 2008 2 0042568 U

(51) Int. Cl.
*H02P 1/16* (2006.01)
(52) U.S. Cl. .................. 318/778; 318/430; 318/603
(58) Field of Classification Search .............. 318/778, 318/430, 603, 245, 811, 785, 786, 788, 791, 318/781
See application file for complete search history.

(56) References Cited

U.S. PATENT DOCUMENTS 3,746,951 A * 7/1973 Hohman .................. 318/786
4,823,054 A * 4/1989 Millauer ................. 318/245

* cited by examiner

*Primary Examiner* — Karen Masih
(74) *Attorney, Agent, or Firm* — Matthias Scholl P.C.; Matthias Scholl

(57) ABSTRACT

A starting circuit for a single-phase AC motor, comprising a main winding, a detecting circuit, a rectifying and filtering circuit, a triggering circuit, a switching circuit and a starting winding. The detecting circuit is connected in series to the main winding for transforming current parameters thereof into detecting signals. The switching circuit is connected in series to the starting winding. The rectifying and filtering circuit processes the detecting signals and the processed detecting signals to the triggering circuit. The triggering circuit enables or disables the switching circuit according to the detecting signals, so as to energize or deenergize the starting winding. The starting circuit features high reliability, long lifetime, simple circuit structure, low cost, and small size.

19 Claims, 2 Drawing Sheets

STARTING CIRCUIT FOR SINGLE-PHASE AC MOTOR

CROSS-REFERENCE TO RELATED APPLICATIONS

This application claims priority benefits to Chinese Patent Application No. 200820042568.X filed on Jan. 3, 2008, the contents of which are incorporated herein by reference.

BACKGROUND OF THE INVENTION

1. Field of the Invention

The invention relates to a starting circuit for a motor, and particularly to a starting circuit for a single-phase AC motor.

2. Description of the Related Art

Single-phase AC motors are widely used in home appliances and industries such as refrigerators, freezers, washing machines, dryers, fans, pumps, and so on. In a three-phase AC motor, after being powered on, a stator winding generates a rotating magnetic field and induces a rotor to rotate. Conventional single-phase AC motors can only generate magnetic field with alternating polarities and strength instead of a rotating magnetic field. Namely, a single-phase AC motor cannot start itself.

To solve the above problem, a single-phase AC motor with a squirrel-cage rotor and a wound stator having a pair of windings (a main winding as a working winding and an auxiliary winding as a starting winding) is used, and the starting winding is connected to a centrifugal switch.

During startup, AC voltage is supplied to the main winding and the starting winding. After the speed reaches 70-85% of a synchronous speed, the centrifugal switch switches off the starting winding and the main winding continues operating. The phase difference between the current of the starting winding and that of the main winding is approximately 90 degrees, and the stator generates rotating magnetic field in air gaps. However, the mechanical contacts in the centrifugal switch often generate electric sparks, which reduce the lifetime and reliability of the centrifugal switch. Moreover, the centrifugal switch is usually disposed in the motor, and thus increases cost and size of the motor. Accordingly much opportunity for improvement remains.

SUMMARY OF THE INVENTION

In view of the above-described problems, it is one objective of the invention to provide a starting circuit for a single-phase AC motor that features high reliability, long lifetime, simple circuit structure, low cost, and small size.

To achieve the above objectives, in accordance with one embodiment of the invention, provided is a starting circuit for a single-phase AC motor, comprising a main winding, a detecting circuit, a rectifying and filtering circuit, a triggering circuit, a switching circuit, and a starting winding.

In a class of this embodiment, the detecting circuit is connected in series to the main winding for transforming the current parameters thereof into detecting signals.

In another class of this embodiment, the switching circuit is serially connected to the starting winding.

In another class of this embodiment, the rectifying and filtering circuit processes the detecting signals and forwards the processed detected signals to the triggering circuit.

In another class of this embodiment, the triggering circuit enables or disables the switching circuit according to the detecting signals, so as to energize or deenergize the starting winding.

In another class of this embodiment, the triggering circuit comprises a controller comprising a bidirectional photoelectric silicon-controlled rectifier (SCR).

In another class of this embodiment, the detecting circuit comprises a noninducting resistor.

In another class of this embodiment, the resistance range of the noninducting resistor is between 20 mΩ (milliohm) and 100 mΩ.

In another class of this embodiment, the switching circuit comprises a bidirectional triode thyristor.

In another class of this embodiment, the switching circuit further comprises a varistor connected in parallel with the bidirectional triode thyristor.

In another class of this embodiment, a polarity transition device is connected to a power input end of the starting winding.

In another class of this embodiment, the rectifying and filtering circuit (3) comprises a diode D1 and a pair of capacitors C1 and C2.

Advantages of the invention comprise:

The circuit of the invention is simple;

Since conventional contacts are not used, there is no limitation to the switching frequency;

Reliable, long lifetime, small size, and low cost solution is provided;

The varistor and the bidirectional triode thyristor absorb any high voltage applied to the bidirectional triode thyristor BG and thus protect the bidirectional triode thyristor BG;

The polarity transition device makes it convenient to change polarities of the control voltage applied to the starting winding;

Forward or reverse rotation of the motor is not controlled by the starting winding, but by polarities of the control voltage; and Different resistance values of the detecting circuit can be obtained according to a rated current of the motor and a switching time of the starting winding; this simplifies the circuit and reduces cost.

BRIEF DESCRIPTION OF THE DRAWINGS

Detailed description will be given below with reference to accompanying drawings, wherein.

DETAILED DESCRIPTION OF THE EMBODIMENTS

Figure 1:
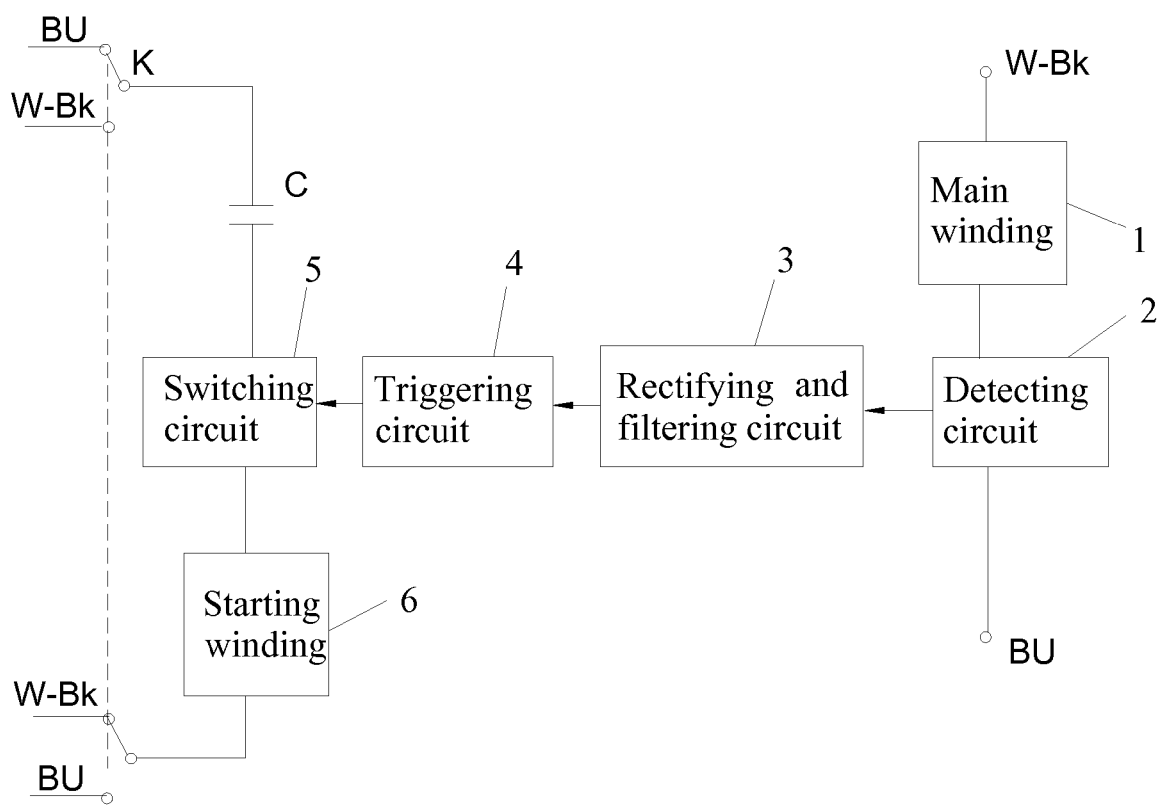
FIG. 1 is a block diagram of a starting circuit for a single-phase AC motor according to one embodiment of the invention.
Figure 2:
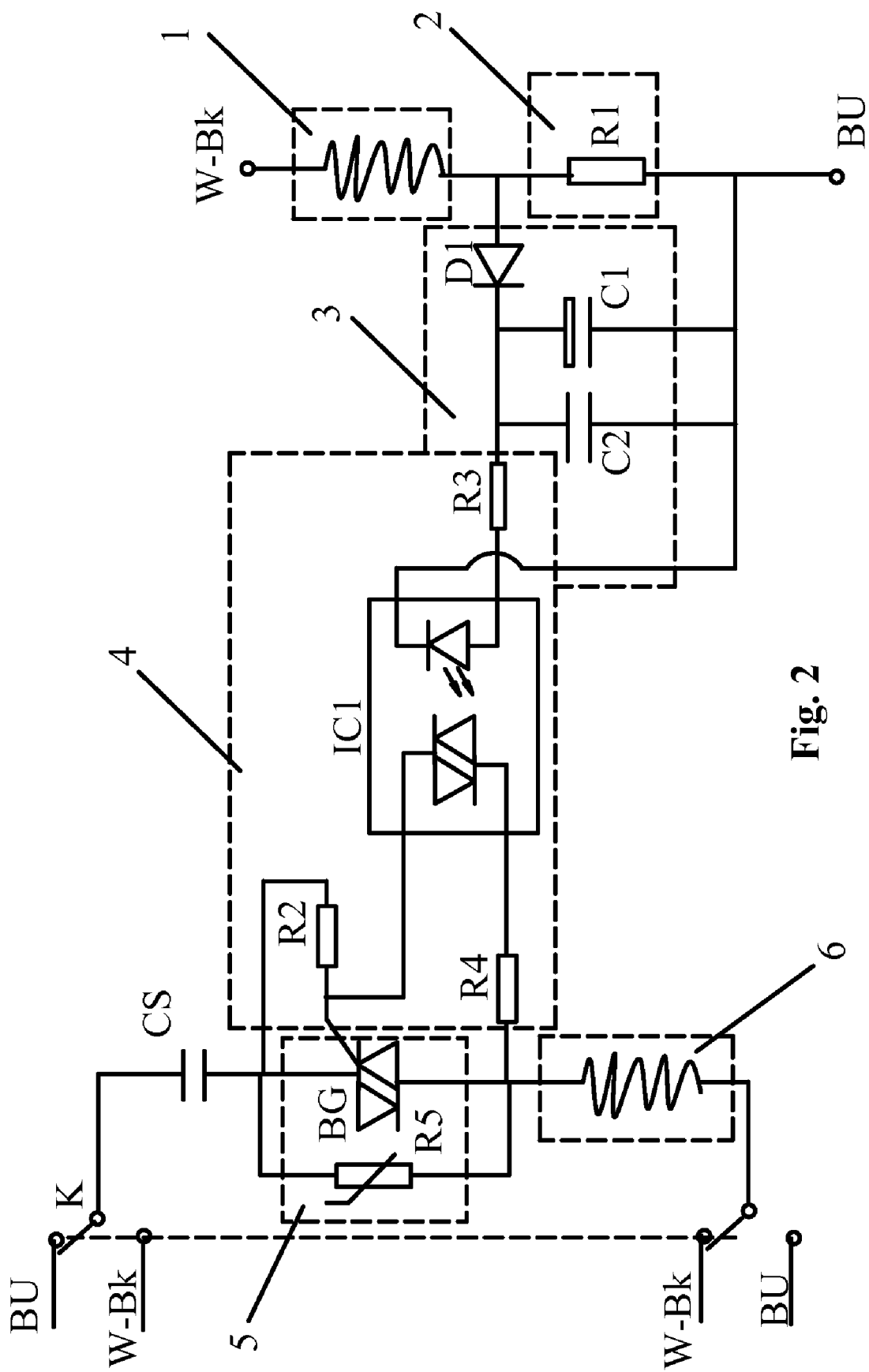
FIG. 2 is a schematic diagram of a starting circuit for a single-phase AC motor according to one embodiment of the invention.

As shown in FIGS. 1 and 2, the starting circuit for a single-phase AC motor comprises a main winding 1, a detecting circuit 2, a rectifying and filtering circuit 3, a triggering circuit 4, a switching circuit 5 and a starting circuit 6.

The detecting circuit 2 is connected in series to the main winding 1 for transforming current parameters thereof into detecting signals. In this embodiment, the detecting circuit 2 is a noninducting resistor R1, and a resistance range of the noninducting resistor R1 is between 20 mΩ and 100 mΩ.

The switching circuit 5 is connected in series to the starting winding 6, and comprises a bidirectional triode thyristor BG and a varistor R5 connected in parallel to the bidirectional triode thyristor BG.

The rectifying and filtering circuit 3 processes the detecting signals and the processed detecting signals to the triggering circuit 4, and comprises a diode D1 and a pair of capacitors C1 and C2.

The triggering circuit 4 enables or disables the switching circuit 5 according to the detecting signals, so as to energize or deenergize the starting winding 6, and comprises a bidirectional photoelectric silicon controlled rectifier (SCR) controller IC1 and a plurality of resistors R2, R3 and R4.

A polarity transition device is connected to a power input end of the starting winding 6. In this embodiment, the polarity transition device is a transfer switch K, and upward and downward movement of the transfer switch K implements polarity transition of the power input end of the starting winding 6.

The operating principle of the starting circuit according to one embodiment of the invention will be described below.

One end of the main winding 1 is connected to a W-Bk end, and the other end thereof is connected to a BU end. After the main winding 1 is started, current flowing through the main winding 1 decreases and voltage drop generated by the noninducting resistor R1 reduces.

At the beginning of the starting process, the voltage drop generated by the noninducting resistor R1 drives the triggering circuit 4 via the rectifying and filtering circuit 3. The triggering circuit 4 switches on a bidirectional triode thyristor BG of the switching circuit 5, the starting winding 6 operates and the rotor rotates.

As the speed of the rotor reaches 70-85% of the synchronous speed, current flowing through the main winding 1 decreases and thus the voltage drop generated by the noninducting resistor R1 reduces so that it cannot drive the triggering circuit 4 via the rectifying and filtering circuit 3. The triggering circuit 4 then switches off the bidirectional triode thyristor BG of the switching circuit 5 and the starting winding 6 stops operating.

If the rotating direction of the motor needs to be changed, it is only required to reverse a polarity of voltage applied by the polarity transition device to the starting winding 6 and there is no need to change a polarity of voltage applied by the main winding 1, which makes the operation simple and convenient.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What claimed is:

1. A starting circuit for a single-phase AC motor, comprising
   a main winding;
   a detecting circuit;
   a rectifying and filtering circuit;
   a triggering circuit;
   a switching circuit; and
   a starting winding;
   wherein
   said detecting circuit is connected in series to said main winding for transforming current parameters into detected signals;
   said switching circuit is connected in series to said starting winding;
   said rectifying and filtering circuit processes said detected signals and forwards processed detected signals to said triggering circuit; and
   said triggering circuit enables or disables said switching circuit according to said detected signals whereby energizing or de-energizing said starting winding.

2. The circuit of claim 1, wherein said triggering circuit comprises essentially a controller comprising bidirectional photoelectric silicon controlled rectifier (SCR).

3. The circuit of claim 1, wherein said detecting circuit comprises a noninducting resistor.

4. The circuit of claim 3, wherein the resistance range of said noninducting resistor is between 20 m$\Omega$ and 100 m$\Omega$.

5. The circuit of claim 3, wherein said triggering circuit comprises essentially a controller comprising a bidirectional photoelectric silicon controlled rectifier (SCR).

6. The circuit of claim 3, wherein said switching circuit comprises a bidirectional triode thyristor.

7. The circuit of claim 6, wherein said switching circuit further comprises a varistor connected in parallel to said bidirectional triode thyristor.

8. The circuit of claim 1, wherein said switching circuit comprises a bidirectional triode thyristor.

9. The circuit of claim 8, wherein said switching circuit further comprises a varistor connected in parallel to said bidirectional triode thyristor.

10. The circuit of claim 1, wherein a polarity transition device is connected to a power input end of said starting winding.

11. The circuit of claim 1, wherein said rectifying and filtering circuit comprises a diode and a pair of capacitors.

12. A starting circuit for a single-phase AC motor, comprising:
    a main winding;
    a detecting circuit;
    a rectifying and filtering circuit;
    a triggering circuit;
    a switching circuit;
    a starting winding having a power input end; and
    a polarity transition device;
    wherein
    said detecting circuit is connected in series to said main winding for transforming current parameters into detected signals;
    said switching circuit is connected in series to said starting winding;
    said rectifying and filtering circuit processes said detected signals and forwards processed detected signals to said triggering circuit; and
    said triggering circuit enables or disables said switching circuit according to said detected signals whereby energizing or de-energizing said starting winding;
    said triggering circuit comprises essentially a controller comprising bidirectional photoelectric silicon controlled rectifier (SCR);
    said detecting circuit comprises a noninducting resistor;
    said switching circuit comprises a bidirectional triode thyristor and a varistor connected in parallel to said bidirectional triode thyristor;
    said rectifying and filtering circuit comprises a diode and a pair of capacitors; and
    said polarity transition device is connected to said power input end of said starting winding.

13. The starting circuit of claim 12, wherein said triggering circuit enables or disables said switching circuit according to said detecting signals, whereby energizing or deenergizing said starting winding.

14. The starting circuit of claim 12, wherein said polarity transition device is a transfer switch, and upward and downward movement of said transfer switch implements polarity transition of said power input end of said starting winding.

15. The starting circuit of claim 12, wherein a voltage drop generated by said noninducting resistor drives said triggering circuit via said rectifying and filtering circuit; and when said triggering circuit switches on said bidirectional triode thyristor of said switching circuit, said starting winding operates.

16. The starting circuit of claim 12, wherein when current flowing through said main winding decreases and a voltage drop generated by said noninducting resistor reduces such that it cannot drive said triggering circuit via said rectifying and filtering circuit, said triggering circuit switches off said bidirectional triode thyristor of said switching circuit and said starting winding stops operating.

17. The starting circuit of claim 12, wherein when the rotating direction of the motor needs to be changed, it is only required to reverse a polarity of voltage applied by said polarity transition device to said starting winding and there is no need to change the polarity of voltage applied by said main winding.

18. A method of starting a single-phase AC motor using the starting circuit of claim 12, comprising:

(a) at the beginning of the starting process, a voltage drop generated by said noninducting resistor drives said triggering circuit via said rectifying and filtering circuit; and when said triggering circuit switches on said bidirectional triode thyristor of said switching circuit, said starting winding operates and the motor rotates; and (b) when the speed of the motor reaches 70-85% of a synchronous speed, current flowing through said main winding decreases and a voltage drop generated by said noninducting resistor reduces such that it cannot drive said triggering circuit via said rectifying and filtering circuit, and said triggering circuit switches off said bidirectional triode thyristor of said switching circuit and said starting winding stops operating.

19. The method of claim 18, wherein when the rotating direction of the motor needs to be changed, it is only required to reverse a polarity of voltage applied by said polarity transition device to said starting winding and there is no need to change the polarity of voltage applied by said main winding.

* * * * *